United States Patent Office 2,822,372
Patented Feb. 4, 1958

2,822,372
PROCESS FOR THE PRODUCTION OF A STABLE COMPLEX COMPOUND OF DIACETYLENE

Herbert Meister, Marl, Westphalia, Germany, assignor to Chemische Werke Huls Aktiengesellschaft, Marl, Kreis Recklinghausen, Germany, a corporation of Germany No Drawing. Application February 16, 1955
Serial No. 488,708

Claims priority, application Germany March 2, 1954

5 Claims. (Cl. 260—439)

It is known that when an ammoniacal solution of a copper or silver salt is treated with diacetylene a complex compound of the diacetylene is precipitated which, especially in the dry state, is explosive.

It has been found that a stable complex compound of diacetylene with nickel can be made by reacting an aqueous ammoniacal solution of nickelous cyanide with diacetylene. The new compound has the empirical formula $C_7H_{19}N_9Ni_2$ and may be made, for example, by shaking or stirring dissolved or gaseous diacetylene with a solution of tetrammine nickelous cyanide in aqueous ammonia having a density of from about 0.92 to 0.96, the concentration of said nickelous compound being about 2% by weight and said solution being at a temperature of from about $-15°$ C. to about $10°$ C. Within this range the reaction is quantitative at 0 to 5° C. when the density of the ammonia is about 0.92 at 15° C. and at $-10$ to $-15°$ C. when the density of the ammonia is about 0.96 at 15° C. The diacetylene advantageously is supplied to the reaction in solution in an inert solvent such as methanol. One may however pass a gas containing diacetylene through the aqueous ammoniacal solution of the nickelous cyanide in which the nickelous compound is in the form of a tetrammine complex. The so-formed complex compound, contrary to expectation, is not explosive and is stable for a long time in the dry state. When exposed to the air it gradually loses ammonia and acquires a brown color. It can be stored for several months without decomposition under exclusion of air.

Since the reaction is quantitative and since the formation of the insoluble complex under the described conditions is specific for diacetylene because acetylene, methyl acetylene, vinyl acetylene and the like are incapable of forming insoluble complexes under such conditions, the described procedure can be used for the analytical determination of diacetylene. The process can be used also for the separation of diacetylene from gases. Since the stable complex compound liberates diacetylene and the tetrammine complex of nickelous cyanide upon being warmed with concentrated ammonia the compound can be used as a source of diacetylene. Pure diacetylene can be obtained from the stable complex compound of diacetylene by treating the compound with cold aqueous alkali metal cyanide solution. In this case the complex compound decomposes with the formation of the nickelous cyanide complex $Me_2Ni(CN)_4$ (Me stands for an alkali metal) and diacetylene.

That a stable complex compound forms under the described conditions is surprising because other salts of divalent nickel and cobalt in aqueous-caustic alkali-ammoniacal solutions yield only unstable complex compounds which are spontaneously explosive in the dry state. These explosive compounds contain one atom of nickel or cobalt combined with two molecules of diacetylene.

The convention is further described and illustrated by the following specific examples.

Example 1

2 to 4 ccm. of the diacetylene concentrate obtained by the arc process and diluted with methanol in order to reduce losses are introduced into and well mixed with a solution of 5.4 g. of tetrammine-nickelous cyanide in 250 ccm. of aqueous ammonia of a density of from 0.93 to 0.95, said solution being cooled to 0 to $-10°$ C. After a few minutes the complex compound precipitates and is separated by suction filtration, washed with cold aqueous ammonia solution and with methanol and ether and dried. The yield is 3.72 g.

Example 2

A shaking vessel having a capacity of 868 ccm. is filled with a gaseous mixture of diacetylene, vinyl acetylene, methyl acetylene and acetylene and cooled to $-5°$ C. Then first 1 cmm. of methanol and then 50 ccm. of a 2% aqueous ammoniacal solution of tetrammine nickelous cyanide (D=0.95) are introduced through a valved pipe. The vessel is then saken for 5–10 minutes, the contents of the vessel are filtered with suction and the residue on the filter is washed as described above. The yield is 0.49 g. of the diacetylene-nickelous compound which corresponds to a diacetylene content in the gas mixture of 3.9%. The precipitation is quantitative and the remaining gas is free of diacetylene.

I claim:

1. Process for the production of a stable complex compound of diacetylene and nickel which comprises reacting diacetylene with a solution of nickelous cyanide in aqueous ammonia of a density of from about 0.92 to 0.96 at 15° C., the concentration of said nickel compound being about 2% by weight at a temperature within the range from $-15°$ to $+10°$ C.

2. Process as defined in claim 1 in which the diacetylene is introduced in the form of a gas mixture containing vinyl acetylene, methyl acetylene and acetylene.

3. Process as defined in claim 1 in which the diacetylene is introduced in the form of a gas.

4. Process as defined in claim 1 in which the diacetylene is introduced in the form of a solution thereof in methanol.

5. As a new product a stable compound having the empirical formula $C_7H_{19}N_9Ni_2$ which is identical with the product of the process defined in claim 1.

No references cited.